United States Patent [19]

Lyregaard

[11] Patent Number: 4,712,245

[45] Date of Patent: Dec. 8, 1987

[54] IN-THE-EAR HEARING AID WITH THE OUTER WALL FORMED BY RUPTURING A TWO-COMPONENT CHAMBER

[75] Inventor: Poul E. Lyregaard, Værløse, Denmark

[73] Assignee: Oticon Electronics A/S, Snekkersten, Denmark

[21] Appl. No.: 694,286

[22] Filed: Jan. 24, 1985

[51] Int. Cl.⁴ .................... H04R 25/02; H04R 31/00; B29B 7/00; B29C 33/40

[52] U.S. Cl. .................... 381/68.6; 264/222; 264/DIG. 30; 425/2; 381/69

[58] Field of Search .............. 179/107 E, 107 R, 179, 179/182 R; 181/132, 135; 381/69; 2/209; 264/222, DIG. 30; 425/2; 379/68.6, 69.2

[56] References Cited

U.S. PATENT DOCUMENTS

| | | | |
|---|---|---|---|
| 3,208,102 | 9/1965 | Kubio | 425/2 |
| 3,470,328 | 9/1969 | Daniels | 381/68.6 |
| 3,496,306 | 2/1970 | Pollack | 381/68.6 |
| 3,513,269 | 5/1970 | Wilson | 425/2 |
| 3,925,277 | 12/1975 | Lampe | 264/222 |
| 4,091,067 | 5/1978 | Kramer et al. | 381/187 |
| 4,617,429 | 10/1986 | Bellafiore | 264/222 |

FOREIGN PATENT DOCUMENTS

| | | | |
|---|---|---|---|
| 1274657 | 8/1968 | Fed. Rep. of Germany | 179/107 E |
| 1487272 | 3/1969 | Fed. Rep. of Germany | 179/107 E |

*Primary Examiner*—Gene Z. Rubinson
*Assistant Examiner*—Danita R. Byrd
*Attorney, Agent, or Firm*—Bucknam and Archer

[57] ABSTRACT

A hearing aid device for processing sound, which comprises a device for transducing sound to an electrical signal, a device for processing the electrical signal, a device for powering and regulating the processing device, and a device for transducing the processed electrical signal into sound, all these devices being enclosed in a case adapted for being inserted in an ear canal, an elastic layer defining a chamber on the outside of the case, the chamber containing a cold-curing composition consisting of at least two components, at least one partitioning wall within the chamber for separating the components from one another, the partitioning wall being adapted to be ruptured by being subjected to a pressure effect, the components being adapted, when being combined upon rupture of said wall, to provide a composition which expands during an initial curing period, and then sets rigidly with a substantial form stability.

3 Claims, 3 Drawing Figures

IN-THE-EAR HEARING AID WITH THE OUTER WALL FORMED BY RUPTURING A TWO-COMPONENT CHAMBER

BACKGROUND OF THE INVENTION

1. Field of the Invention

Traditionally hearing aid devices have been worn behind the ear, with a sound-conducting tube connected to an earmould placed in the concha and meatus of the hearing-impaired. More recently miniaturization has allowed the electro-acoustic means to be inserted into the earmould, the so-called in-the-ear hearing aids, filling out partly or wholly the concha. Further developments have allowed the size to be diminished so that the entire earmould/hearing aid is substantially retained within the meatus, with only a minor part of the device protruding into the concha, the so-called canal-aids.

A canal-aid has two main advantages: the acoustics are beneficial to the hearing-impaired, due to diffraction around the pinna, and the aid is inconspicuous in use.

2. Description of the Related Art

At present there are the following two techniques available for manufacturing canal-aids:

1. Based on an accurate impression of the individual ear, a shell is cast in acrylics, or produced in metal by electroplating, and the electro-acoustic components of the device are installed in this individually produced shell.
2. The aid is manufactured with a standard case resembling a typical ear canal, and is either inserted directly in the ear canal, or fitted with one of several size adaptor earmoulds which are standard.

The former is referred to as a custom-made canal-aid, and the latter as a modular canal-aid.

The custom-made canal-aid entails the disadvantage that it is manufactured to the individual ear, normally by a specialist manufacturer. Therefore, long time may elapse before the aid is ready, and the customer must place an order without having tried the aid, furthermore, a custom-made hearing aid tends to be expensive to manufacture.

The modular aid, on the other hand, may not secure a comfortable fit in the ear canal, since the earmould is not made to the individual ear. For the same reason, adequate acoustical seal between ear canal and aid is difficult to achieve, frequently resulting in acoustical feed-back due to the short distance between the locus of the amplified sound and the microphone.

SUMMARY OF THE INVENTION

The invention concerns a modular canal-aid, provided with integral means adapted to shape themselves according to the individual ear canal. The hearing aid according to the invention has the advantage that it cannot only be mass-produced and held in stock, but also be fitted to the individual ear canal, as the custom-made canal-aid. Moreover, it can be fitted while the customer waits, and the customer can, if necessary, try several different versions before purchase.

BRIEF DESCRIPTION OF THE DRAWINGS

Details of the invention will now be described with reference to the drawing, in which FIG. 1 schematically shows a longitudinal section through a first embodiment of an ear aid according to the invention.

BRIEF DESCRIPTION OF THE DRAWINGS

Figure 1:
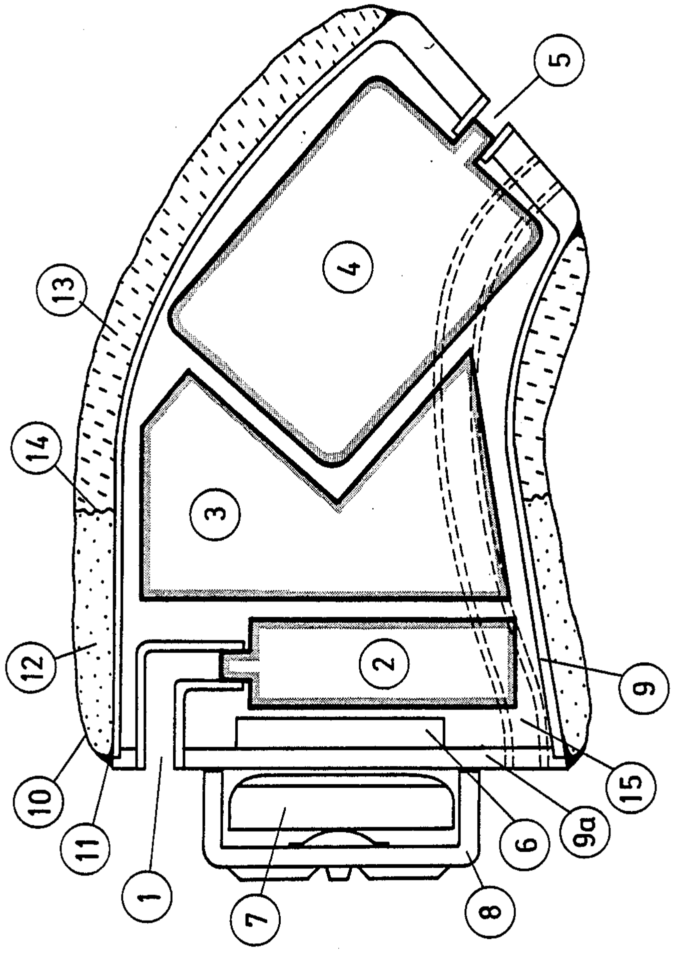
Figure 2:
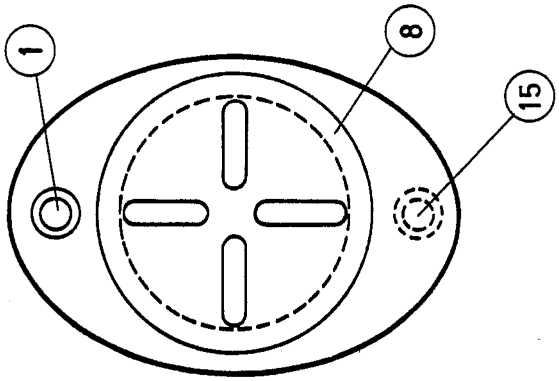
FIG. 2 shows a left end view of a part of said embodiment.

The embodiment according to FIGS. 1 and 2 comprises a microphone 2 with associated inlet 1, an electronic amplifying system 3, a transducer 4 with associated outlet 5, and a gain-regulating potentiometer 6, all housed in a standard case 9. The size and shape of the case is such that its cross-section is somewhat smaller than equivalent cross-sections of most ear canals, and the case is assembled in such a manner that the lid 9*a* thereof can cope with the mechanical strain imposed when inserting or extracting the aid for the ear.

To the case is also attached a replaceable battery 7 held in position by a cover 8, which also is used as the control knob for the gain-potentiometer 6. The entire unit 1 to 9 is referred to as the electroacoustic cartridge.

The combined battery cover/gain potentiometer control knob 8 is designed to allow some overflow of the ear-mould part beyond the case lid without impeding manipulation of the cover/knob, and such that the knob provides a suitable grip for extracting the hearing aid from the ear.

The cartridge may also be equipped with an integral vent tube 15 in order to relieve pressure in the ear canal and thus improve wearer comfort.

A thin and elastic layer, e.g. of silicone-rubber 10 is attached as an envelope round the case 9 and sealed 11 at both ends of the cartridge. The space between said layer and said case 9 is filled with a two-component cold-curing composition, e.g. ear impression material 12 and 13. The two components are separated by a thin partitioning wall 14 which is impermeable to either component, but which is easily ruptured when subjected to a pressure effect. The cold-curing composition is selected such that upon combining of the said components upon rupture of said partitioning wall 14, it hardens after a short curing period, e.g. 5–10 minutes, and such that it expands during the initial curing period, but sets rigidly with good form stability when cured.

The method of fitting the hearing aid is as follows: after selecting a hearing aid device with electroacoustical properties suitable for the hearing loss in question, the fitter applies pressure to the elastic layer 10, thereby rupturing the wall 14 partitioning the two components 12 and 13. The kneading ensures adequate mixing of said two components, and the said device is then inserted into the ear canal and left for curing. This ensures an earmould which is shaped according to the individual ear canal, thus providing both a comfortable fitting and a good seal between ear canal and earmould. The elastic layer 10, which must be non-toxic, non-allergenic, and impermeable to the said components and composition, ensures an earmould surface which is both durable and which does not give rise to allergic reactions, even if the cold-curing composition is not completely cured. This technique therefore allows a standard mass-produced canal aid unit 1–14 to be fitted to the individual ear canal while the customer waits.

Figure 3:
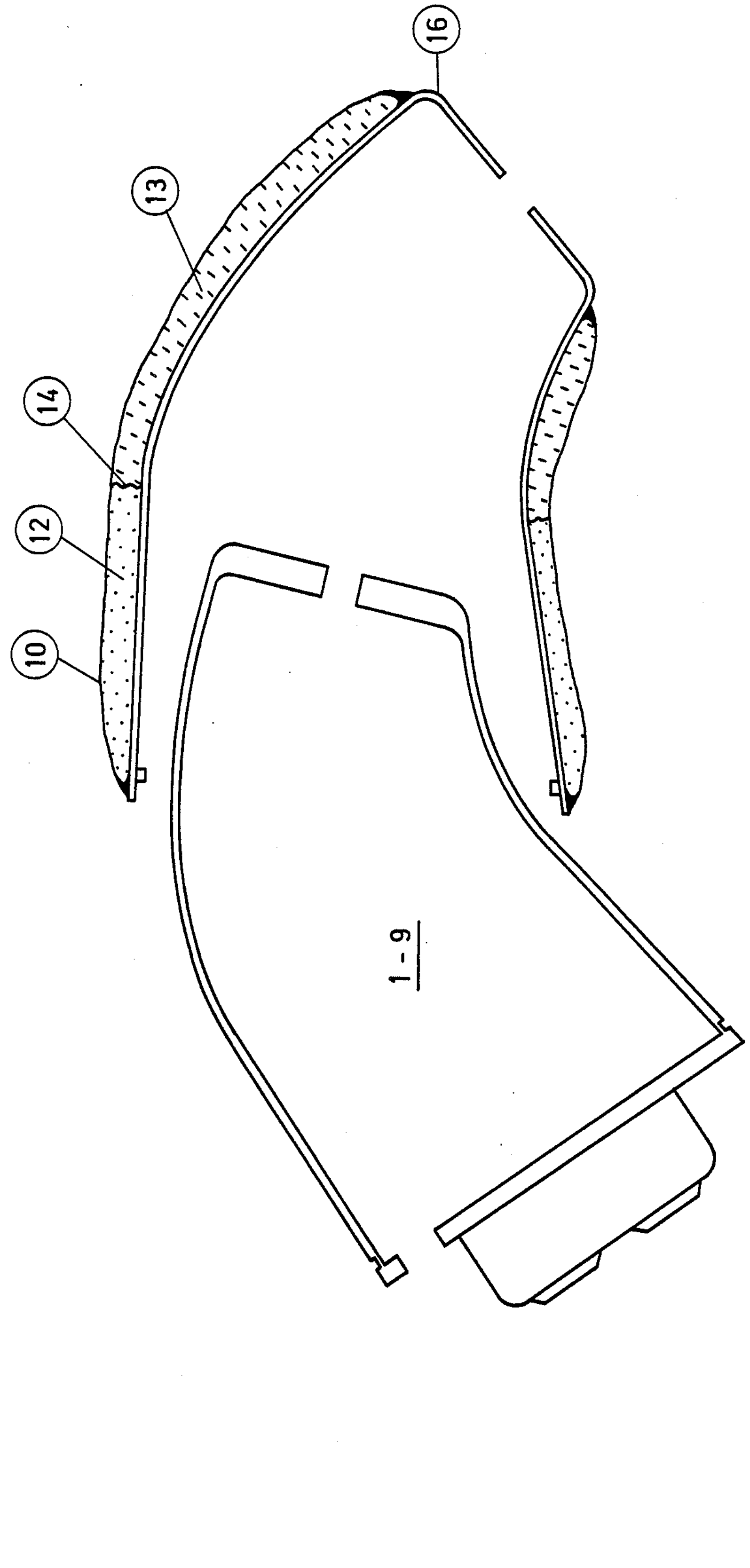
FIG. 3 shows a second embodiment of the ear aid.

Moreover, if the first fitting is unsuccessful, a new aid unit may be tried without serious financial repercussions, since it would be a simple matter to strip the cured earmould from the cartridge, and thus salvage the more expensive component 1–9. In fact, if the parts 10 to 14 are attached to a separate shell 16, and the cartridge 1–9 fits into said shell 16 as indicated in FIG. 3, it is then a very simple and inexpensive procedure to discard the earmould part 10–14, 16 of the canal aid and insert the cartridge 1–9 into a new earmould part 10–14, 16.

The layer 10 should be provided with a substantially smooth outer surface, so that it can be easily inserted into an ear canal. Moreover, said layer may comprise a stretch-elastic material for supporting a correct fitting procedure.

I claim:

1. A device for improving the hearing of the wearer comprising an electroacoustic cartridge, said cartridge having ends, said cartridge being constituted by means for transducing sound to an electrical signal, means for processing said electrical signal, means for powering and regulating said processing means, and means for transducing the processed electrical signal into sound, a casing enclosing said electroacoustic cartridge, said casing being adapted for insertion into the ear canal of the wearer, an elastic layer surrounding said casing, said elastic layer having ends, the ends of said layer being sealed to the ends of said cartridge, said layer together with said casing defining a closed chamber, said chamber containing a cold-curing composition consisting of at least two components, at least one partitioning wall within said chamber for separating said components one from the other, said partitioning wall being adapted to be ruptured when subjected to pressure, said components being adapted, when being combined upon rupture of said wall, to provide a composition which expands during an initial curing period, and then sets rigidly with a substantial form stability.

2. The hearing aid device according to claim 1 wherein said casing has a lid.

3. A device for improving the hearing of the wearer comprising an electroacoustic cartridge constituted by means for transducing sound to an electrical signal, means for processing said electrical signal, means for powering and regulating said processing means, and means for transducing the processed electrical signal into sound, a shell enclosing said electroacoustic cartridge, said shell being adapted for insertion in the ear canal of the wearer, an elastic layer sealed to said shell, said elastic layer surrounding said shell and together with said shell defining a closed chamber, said chamber containing a cold-curing composition consisting of at least two components, at least one partitioning wall within said chamber for separating said components one from the other, said partitioning wall being adapted to be ruptured when subjected to pressure, said components being adapted, when being combined upon rupture of of said wall, to provide a composition which expands during an initial curing period, and then sets rigidly with a substantial form stability, said acoustical cartridge fitting into said shell.

* * * * *